United States Patent [19]  [11] 4,082,607
Divona  [45] Apr. 4, 1978

[54] FUEL SUBASSEMBLY LEAK TEST CHAMBER FOR A NUCLEAR REACTOR

[75] Inventor: Charles J. Divona, Santa Ana, Calif.

[73] Assignee: The United States of America as represented by the United States Department of Energy, Washington, D.C.

[21] Appl. No.: 728,360

[22] Filed: Sep. 30, 1976

[51] Int. Cl.² .............................................. G21C 17/00
[52] U.S. Cl. .................................. 176/19 LD; 176/30
[58] Field of Search ................. 176/19 R, 19 LD, 87, 176/30; 251/147; 73/40, 49.2, 49.3; 250/390–392

[56] References Cited

U.S. PATENT DOCUMENTS

| 2,930,744 | 3/1960 | Shillitto et al. | 176/30 |
|---|---|---|---|
| 3,142,625 | 7/1964 | Wellborn | 176/19 R |
| 3,419,467 | 12/1968 | Holzer et al. | 176/19 LD |
| 3,801,441 | 4/1974 | Jones | 176/19 R |
| 3,855,058 | 12/1974 | Groos et al. | 176/19 LD |
| 3,915,792 | 10/1975 | Aubert et al. | 176/30 |
| 3,947,318 | 3/1976 | Zhuchkov et al. | 176/19 LD |
| 3,983,741 | 10/1976 | Honig et al. | 176/19 LD |
| 3,998,426 | 12/1976 | Isbester | 251/147 |
| 4,016,749 | 4/1977 | Wachter | 176/19 LD |

FOREIGN PATENT DOCUMENTS 958,921  5/1964  United Kingdom ................... 176/30

OTHER PUBLICATIONS

Fast Reactor Technology: Plant Design, Milit. Press, Yevick et al. (1966), pp. 347–348.

Primary Examiner—Samuel W. Engle
Assistant Examiner—S. A. Cangialosi
Attorney, Agent, or Firm—Dean E. Carlson; Frank H. Jackson; Joseph N. Hosteny

[57] ABSTRACT

A container with a valve at one end is inserted into a nuclear reactor coolant pool. Once in the pool, the valve is opened by a mechanical linkage. An individual fuel subassembly is lifted into the container by a gripper; the valve is then closed providing an isolated chamber for the subassembly. A vacuum is drawn on the chamber to encourage gaseous fission product leakage through any defects in the cladding of the fuel rods comprising the subassembly; this leakage may be detected by instrumentation, and the need for replacement of the assembly ascertained.

4 Claims, 4 Drawing Figures

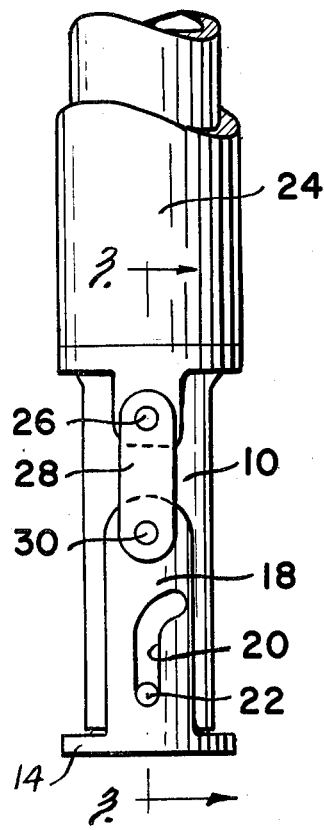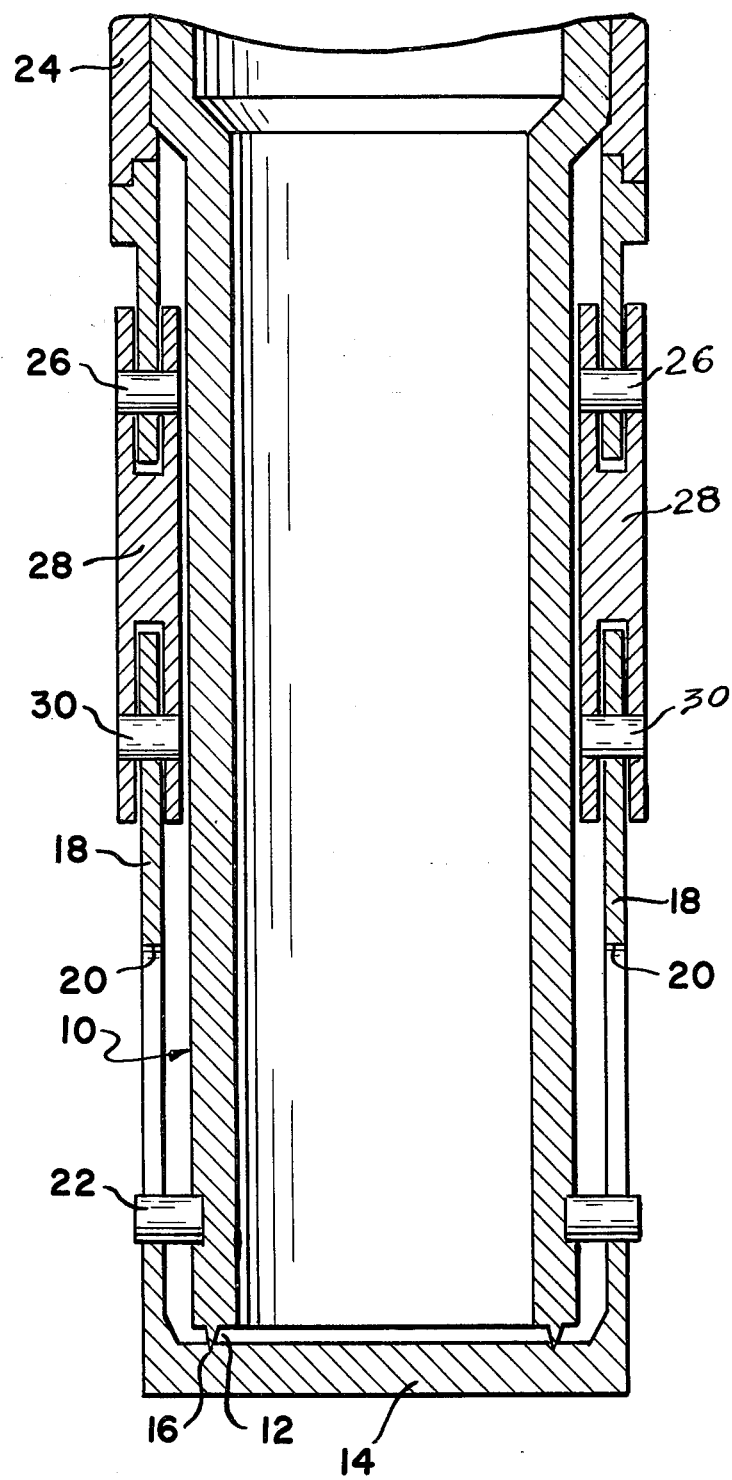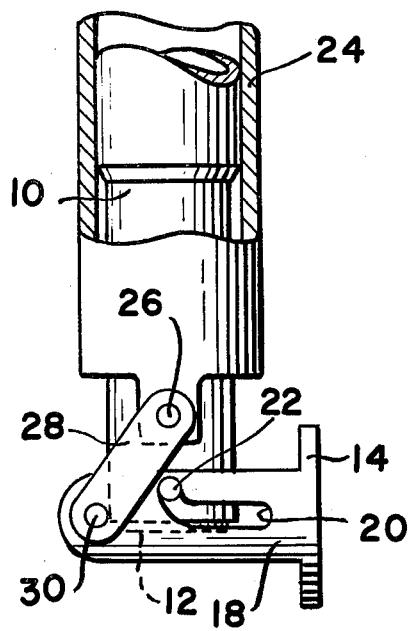

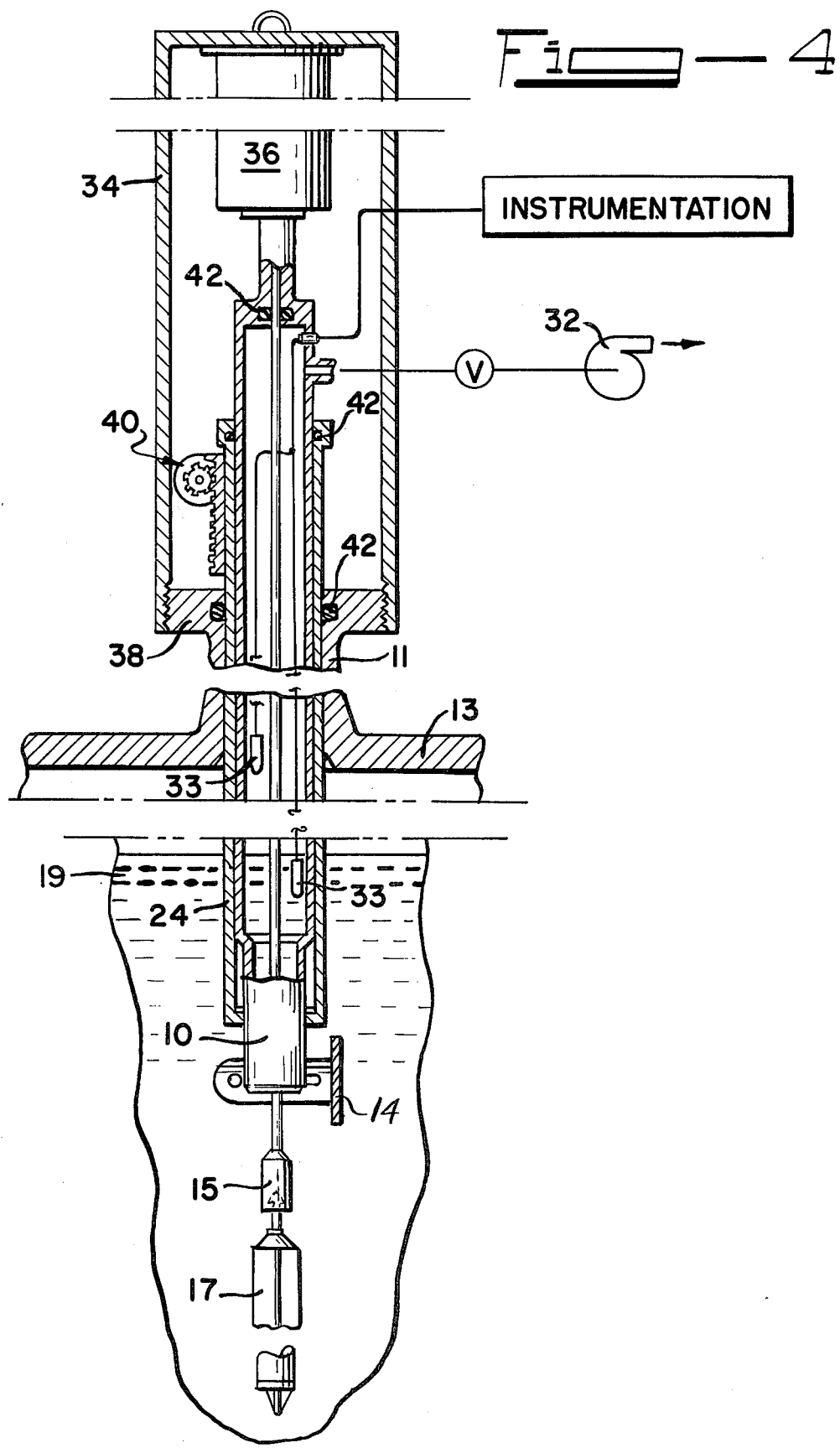

FUEL SUBASSEMBLY LEAK TEST CHAMBER FOR A NUCLEAR REACTOR

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

In nuclear reactors, fuel is often manufactured in rod form; a rod is then inserted into a metal tube, referred to as cladding, and the tube is sealed. The combination of fuel and tube constitutes a fuel rod, which is combined with a number of other fuel rods to form a subassembly. Subassemblies are combined to form a reactor core, which is submerged in a primary tank containing coolant.

Rapid, accurate detection of fission product leakage from fuel subassemblies via cladding defects is important for several reasons. First, the fission products are highly radioactive. Second, leaking fission products diffuse in and contaminate coolant and cover gas, which is an inert gas filling the space above the coolant in the primary tank. Elements present in these materials as well as in mechanical structures and components may also be activated. This increase in general radioactivity both decreases the structural integrity of the reactor by long term damage to crystalline structure and presents a hazard to operation and maintenance of the machinery by personnel. Also, radioactive waste volume is increased.

Detection of the increased levels of radioactivity and identification of the radioisotopes involved is possible. However, identification of the particular fuel subassembly or subassemblies from which the fission products are escaping is complicated because there may be several hundred fuel subassemblies within a reactor; furthermore, visibility and movement are restricted by the extremely high levels of radioactivity, the opaqueness of the coolant and the limited area available inside the primary tank for remotely controlled mechanical handling equipment. The leaking subassembly must, of course, be identified or else a group of subassemblies must be removed to insure that the leaking subassembly is out of the reactor; the quickest and most economical way to accomplish this task is to be able to individually test fuel subassemblies while they are contained within the primary tank.

Various means of accomplishing this testing are known, such as detection instruments installed in individual subassemblies, or sample tubing leading from each subassembly to some measurement station external to the primary tank. Unfortunately, these methods complicate the internal design of the reactor and also complicate fuel assembly installation, removal, and shuffling (the movement of fuel assemblies from one position to another in the reactor) due to the extensive additional structure required. Furthermore, they may also necessitate numerous additional penetrations of the tank, thus increasing maintenance and the possibility of leaks from inside the tank to the environment.

The present invention was conceived and designed for use in the Experimental Breeder Reactor II (EBR-II), a liquid-sodium-cooled, fast-breeder reactor; see *Solid Fuel Reactors*, pp. 118-238 (J. R. Dietrich & W. H. Zinn Ed. 1958; Addison-Wesley, Reading, Mass.) for a description of EBR-II. A cylindrical container with a remotely operated shutter valve on one end is placed inside the primary tank via a spare nozzle in the primary tank cover. It permits testing of individual fuel subassemblies without requiring additional permanent structure inside the primary tank.

SUMMARY OF THE INVENTION

According to the present invention, a tube-like container, closed by a valve actuated by a mechanical linkage disposed about the container, is inserted into a liquid-metal-cooled reactor via a nozzle in the cover of a primary tank, which contains a pool of liquid metal coolant in which the reactor core is submerged. The valve seals the container so that a vacuum may be drawn within it by a vacuum pump connected to the other end of the container. Once inside the primary tank, the valve is opened and moved to one side by the linkage so that an individual fuel subassembly may be lifted into the container by a gripper extending into the primary tank through the container. The container is partially submerged in the liquid metal coolant to allow it to flood, thus maintaining a subassembly at a safe temperature while in the container. Once the assembly is inserted and the chamber is partially flooded with liquid metal coolant, the valve is closed and a partial vacuum is drawn on the container. The vacuum causes fission products to be released to the atmosphere of the container through cladding defects due to the higher pressure inside the cladding of the fuel subassembly. Any fission products present are then detected by instrumentation. If the subassembly does leak, it may be withdrawn from the primary tank by the fuel handling equipment and replaced with a fresh fuel subassembly.

A purge gas may also be pumped through the test chamber and monitored in an external sampling station instead of drawing a vacuum on the chamber.

It is an object of the invention to provide a container for detecting fission product leaks in individual fuel subassemblies.

It is a further object of the invention to enable detection of leaks in individual fuel subassemblies without entailing additional structure permanently installed inside the primary tank such as instrumentation, sampling tubes, gas traps, etc.

It is a further object of the invention to provide a device which makes possible detection of leaks without allowing the leakage to contaminate the remainder of the reactor and coolant.

It is a further object of the invention to provide a device which may be inserted and operated through a spare pipe nozzle in the cover of a primary tank surrounding a nuclear reactor core.

BRIEF DESCRIPTION OF THE DRAWINGS

FIG. 1 is a partial view of a fuel subassembly leak test chamber for a liquid-metal-cooled, fast-breeder nuclear reactor.

FIG. 2 is a partial view of the chamber in the open position ready to receive a fuel subassembly.

FIG. 3 is a partial section of the chamber taken along line 3—3 in FIG. 1.

FIG. 4 is a view of the leak test chamber receiving a fuel subassembly.

SPECIFIC EMBODIMENT OF THE INVENTION

Commencing with FIG. 1, the chamber consists of a container pipe 10, which forms most of the boundary of the leak test chamber, surrounded by an actuator pipe 24. The tubelike shape of the chamber permits it to be inserted into the primary tank through a preexisting spare nozzle 11 in a cover 13 of a primary tank; see FIG. 4. One end of the container pipe 10 is sealed except for a vacuum-drawing connection and a gripper 15 which can pass through the chamber.

Turning to FIG. 3, the container pipe 10 has a knifeedge 12 around the circumference of the open end. The open end of the container pipe 10 can be sealed by a disc-like shutter valve 14 which has a shutter valve sealing surface 16 mating with the container pipe knifeedge 12, thus providing a tight seal at that end of the chamber. Shifting back to FIG. 1, the shutter valve 14 is attached to the container pipe 10 by two valve arms 18. Each of the valve arms 18 contains a "J" shaped groove 20; these grooves will control the motion of the shutter valve 14 upon opening and closing of the valve. The "J" shaped grooves 20 each surround a container pin 22, which pins project radially from the side of the container pipe 10 near the open end of the container pipe. The container pins 22 are diametrically opposed; see FIG. 3.

The shutter valve 14 is opened and closed by the actutor pipe 24 which surrounds the container pipe 10. The surface of the container pipe 10 acts as a bearing for the interior surface of the actuator pipe 24. The pipe-within-a-pipe design serves two purposes. First, it takes the minimum room and allows the chamber to be inserted through the spare nozzle 11 while providing maximum internal space for the gripper 15 and a fuel subassembly 17 shown in FIG. 4. Second, the round external shape of the chamber makes sealing between the nozzle 11 and chamber, to prevent cover gas and metal vapor leakage, a simple matter because of the absence of edges, corners or other discontinuities.

Two diametrically opposed actuator pipe pins 26 are mounted on the actuator pipe 24. These pins 26 are pivotally connected to links 28 and transmit the linear motion of the actuator pipe 24 to links 28. At their opposite ends the links 28 are pivotally connected to the valve arms 18 by pins 30. The pins 30 transmit the linear motion of the linking members 28 to the valve arms 18 and permit rotation of the valve arms 18 and links 28 by the container pins 22 operating in conjunction with the "J" shaped grooves 20.

As the actuator pipe 24 slides toward the open end of the container pipe 10, the motion of the actuator pipe 24 is transmitted to the shutter valve 14 by the pins 26 and 30, the links 28, and the valve arms 18. The motion of the shutter valve 14 is initially linear and in the same direction as that of the actuator pipe 24; this is accomplished by the guiding function of container pins 22 sliding in the "J" shaped grooves 20. As shown in FIG. 2, when the container pins 22 enter the curved portion of "J" shaped grooves 20, the linear motion of the actuator pipe 24 is converted to curvilinear motion by the "J" shaped grooves 20, the pins 22, 26, and 30, and the links 28. The result is that the shutter valve 14 is constrained to move in the path described by the "J" shaped grooves 20; it moves to one side to give unobstructed access to the container pipe 10.

Turning to FIG. 4, the fuel subassembly 17 may now be lifted into the container pipe 10 by the gripper 15 extending through the test chamber and the action described is reversed to close and seal the chamber. Leak detection may now take place; a vacuum is drawn on the chamber by a vacuum pump 32 and detectors 33 sense the presence of leaking fission products. The chamber extends through the primary tank cover 13 and is partially submerged in liquid metal coolant 19 inside the primary tank in order to flood the chamber to provide adequate cooling of the subassembly under test. A container 34 supports and encloses a gripper drive 36 and the test chamber and is supported itself by threaded engagement with a flange 38 on the nozzle 11 in the primary tank cover 13. A manual rack and pinion 40 is employed to drive the actuator pipe 24. Seals 42 prevent leakage of cover gas to atmosphere.

Since the chamber must be suitable for submersion in liquid metal at a temperature of 700° C., it is constructed of stainless steel. One material which may be used for knife-edge 12 and sealing surface 16 is an alloy consisting of 10-20% chrome, 2% boron, 2% silicon, 2.5% iron and the remainder nickel; it may be flame-sprayed on the knife-edge and sealing surface which are then heat treated to obtain different hardnesses so that knife-edge 12 will seat properly against sealing surface 16.

The embodiments of the invention in which an exclusive property or privilege is claimed are defined as follows:

1. A test chamber for isolating fuel subassemblies inside the primary tank of a nuclear reactor to detect leakage of fission products therefrom comprising:

a cylindrical container pipe having an open end, means for drawing a vacuum in the pipe and means for sealably extending a gripper through the container pipe, an actuator pipe surrounding the container pipe and slidable thereon, the surface of the container pipe acting as a bearing for the actuator pipe, said actuator pipe being small enough in diameter to be inserted into the primary tank through a pipe nozzle in the cover thereof, a shutter valve consisting of a circular disc for sealing the open end of the container pipe, and means connected to said actuator pipe and operable thereby for operating the shutter valve to allow the gripper to lift a fuel assembly into the container pipe and to seal the container pipe.

2. The test chamber in claim 1 wherein the means connected to the container pipe consists of, a pair of diametrically opposed container pins projecting radically outward from the container pipe near the open end, a pair of valve arms which connect the shutter valve to the container pipe, each of which has a J-shaped groove therein surrounding one of the container pins, a pair of links which are pivotably attached to the actuator pipe and to the valve arms, whereby sliding the actuator pipe toward the open end of the container pipe will transmit motion to the shutter valve via the links and valve arms, the motion of the shutter valve being initially linear due to the movement of the grooves in the valve arms about the container pins, and then curvilinear so that the shutter valve is moved to one side presenting unobstructed access to the container pipe open end.

3. The test chamber in claim 2 wherein the open end of the cylindrical container pipe has a knife edge and the shutter valve has a sealing surface for engagement with the knife edge for sealing the open end of the container pipe.

4. The test chamber in claim 3 wherein the nuclear reactor is a liquid metal cooled nuclear reactor which is submerged in a pool of liquid sodium, the test chamber thereby being partially submerged in liquid sodium when in position in the primary tank of a nuclear reactor.

* * * * *